(12) United States Patent
Evans et al.

(10) Patent No.: US 9,363,660 B2
(45) Date of Patent: Jun. 7, 2016

(54) PROCESSING DATA IN A CLUSTER OF NETWORK NODES

(71) Applicant: Metaswitch Networks Ltd, Enfield (GB)

(72) Inventors: Michael Jeffrey Evans, High Wycombe (GB); Matthew Williams, London (GB); Shaun Crampton, San Francisco, CA (US)

(73) Assignee: Metaswitch Networks Ltd., Enfield (GB)

( * ) Notice: Subject to any disclaimer, the term of this patent is extended or adjusted under 35 U.S.C. 154(b) by 10 days.

(21) Appl. No.: 14/266,686

(22) Filed: Apr. 30, 2014

(65) Prior Publication Data

US 2014/0323127 A1    Oct. 30, 2014

Related U.S. Application Data

(63) Continuation-in-part of application No. 14/166,819, filed on Jan. 28, 2014.

(30) Foreign Application Priority Data

| Apr. 30, 2013 | (GB) | 1307811.8 |
| May 3, 2013 | (GB) | 1308078.3 |
| May 3, 2013 | (GB) | 1308080.9 |
| Jan. 17, 2014 | (GB) | 1400841.1 |

(51) Int. Cl.
*H04W 4/00* (2009.01)
*H04W 8/06* (2009.01)
(Continued)

(52) U.S. Cl.
CPC .............. *H04W 8/06* (2013.01); *H04L 67/125* (2013.01); *H04L 67/2842* (2013.01); *H04W 8/12* (2013.01); *H04W 80/10* (2013.01)

(58) Field of Classification Search
CPC .................. H04L 63/18; H04M 15/41; H04M 2215/0164; H04M 15/88; H04M 15/83; H04M 15/62; H04M 15/57; H04M 15/852
USPC ...................................... 455/435.1
See application file for complete search history.

(56) References Cited

U.S. PATENT DOCUMENTS

| 2006/0136557 A1 | 6/2006 | Schaedler et al. |
| 2006/0149812 A1 | 7/2006 | Lin et al. |

(Continued)

FOREIGN PATENT DOCUMENTS

| EP | 2230818 A1 | 9/2010 |
| WO | 2008054647 A1 | 5/2008 |

(Continued)

OTHER PUBLICATIONS

3rd Generation Partnership Project; Technical Specification Group Services and Sytem Aspects; IP Multimedia Subsystem Aspects (IMS). Stage 2 (Release 5). Oct. 1, 2001.

*Primary Examiner* — Thomas Lett
(74) *Attorney, Agent, or Firm* — EIP US LLP

(57) ABSTRACT

Measures for processing data in a telecommunications network. At a cache, a subscriber configuration data request requesting subscriber configuration data for a subscriber device is received from a network node in a cluster of network nodes. In response to receipt of the subscriber configuration data request, it is determined that a shared cache store does not contain subscriber configuration data for the subscriber device. In response to the determination, subscriber configuration data for the subscriber device is retrieved from a subscriber configuration network node. The subscriber configuration data for the subscriber device retrieved from the subscriber configuration network node is transmitted to the network node.

30 Claims, 8 Drawing Sheets

(51) Int. Cl.
*H04L 29/08* (2006.01)
*H04W 80/10* (2009.01)
*H04W 8/12* (2009.01)

(56) References Cited

U.S. PATENT DOCUMENTS

| | | |
|---|---|---|
| 2008/0155659 A1 | 6/2008 | Gazier et al. |
| 2008/0240084 A1 | 10/2008 | Tsukiashi et al. |
| 2008/0256083 A1 | 10/2008 | Wakefield |
| 2008/0267199 A1* | 10/2008 | Smith et al. ............ 370/401 |
| 2009/0319641 A1 | 12/2009 | Verbandt et al. |
| 2010/0184403 A1 | 7/2010 | Cai et al. |
| 2012/0092997 A1 | 4/2012 | Mihaly et al. |

FOREIGN PATENT DOCUMENTS

| | | |
|---|---|---|
| WO | 2009124594 A1 | 10/2009 |
| WO | 2011106690 A2 | 9/2011 |
| WO | 2011146844 A1 | 11/2011 |
| WO | 2012149966 A1 | 11/2012 |

\* cited by examiner

PROCESSING DATA IN A CLUSTER OF NETWORK NODES

CROSS-REFERENCE TO RELATED APPLICATIONS

This application claims priority under 35 U.S.C. §119(a) to each of GB Patent Application No. 1307811.8, filed Apr. 30, 2013, GB Patent Application No. 1308080.9, filed May 3, 2013, GB Patent Application No. 1308078.3, filed May 3, 2013, and GB Patent Application No. 1400841.1, filed Jan. 17, 2014. This application is also a continuation-in-part of U.S. patent application Ser. No. 14/166,819, filed on Jan. 28, 2014, which claims priority under 35 U.S.C. §119(a) to each of GB Patent Application No. 1307811.8, filed Apr. 30, 2013, GB Patent Application No. 1308080.9, filed May 3, 2013, GB Patent Application No. 1308078.3, filed May 3, 2013, and GB Patent Application No. 1400841.1, filed Jan. 17, 2014. Each of the above-referenced patent applications is hereby incorporated by reference in its entirety.

BACKGROUND OF THE INVENTION

1. Field of the Invention

The present disclosure relates to processing data. In particular, but not exclusively, the present disclosure relates to processing data in a telecommunication network.

2. Description of the Related Technology

Internet Protocol (IP) telephony networks, such as those conforming to the IP Multimedia Subsystem (IMS) are currently experiencing an increase in prevalence. In such networks, telephony services are typically provided according to the Session Initiation Protocol (SIP). An IP telephony network may contain a number of network nodes, such as Call Session Control Function (CSCF) entities in the case of IMS, which are responsible for conducting registration procedures, handling routing requests and/or handling service requests in the network. In the context of SIP, such a network node may fulfil the roles of a SIP server and/or SIP proxy. Network nodes should therefore maintain state information (for example routing data, authentication data etc.) for each subscriber that they serve. For relatively small numbers of subscribers, it may be possible for each network node to maintain state information for every subscriber. However, for large numbers of subscribers, the memory requirements for storing state information for every subscriber at each network node and the requirement for replicating the state information between all network nodes in the network can become prohibitive.

In order to cater for larger numbers of subscribers, sharding techniques are known to be employed in IMS networks. Sharding involves allocating a longstanding responsibility for a subset of the subscribers in the telecommunications network to each network node in the network. Each network node therefore need only maintain state information for its allocated subset of subscribers. In a typical example, when a subscriber device registers with the network, it may be allocated to a network node, such as a Serving CSCF (S-CSCF) in the case of IMS, which is thereafter responsible for maintaining the appropriate state information for that subscriber until such time as the device unregisters from the network. However, this approach suffers from increased routing complexity because any messages (for example, requests) relating to a given subscriber that are handled after the initial registration must be routed via the appropriate, sharded network node. Further, the complexity of providing redundancy between sharded network nodes in order to handle failure of an individual network node in the network is increased.

Hence, it would be desirable to provide improved and/or alternative techniques for handling potentially large numbers of subscribers and/or providing the required network scalability to do so.

SUMMARY

According to a first embodiment, there is a method of processing data in a telecommunications network, the network comprising: a cluster of network nodes responsible for conducting registration procedures for subscriber devices and/or processing routing data relating to communication sessions conducted in the network; a subscriber configuration network node responsible for storing subscriber configuration data for a plurality of subscriber devices; and a cache comprising a shared cache store for caching subscriber configuration data for subscriber devices, the shared cache store being accessible by each of the network nodes in the cluster of network nodes, the method comprising, at the cache: receiving, from a network node in the cluster of network nodes, a subscriber configuration data request requesting subscriber configuration data for a subscriber device; in response to receipt of the subscriber configuration data request, determining that the shared cache store does not contain subscriber configuration data for the subscriber device; in response to the determination, retrieving subscriber configuration data for the subscriber device from the subscriber configuration network node; and transmitting the subscriber configuration data for the subscriber device retrieved from the subscriber configuration network node to the network node.

According to a second embodiment, there is a system for processing data in a telecommunications network, the system comprising a shared cache store for caching subscriber configuration data for subscriber devices, the shared cache store being accessible by each network node in a cluster of network nodes responsible for conducting registration procedures for subscriber devices and/or processing routing data relating to communication sessions conducted in the network, the system comprising at least one processor, and at least one memory including computer program code, the at least one memory and the computer program code being configured to, with the at least one processor, cause the system at least to: receive, from a network node in the cluster of network nodes, a subscriber configuration data request requesting subscriber configuration data for a subscriber device; determine, in response to receipt of the subscriber configuration data request, that the shared cache store does not contain subscriber configuration data for the subscriber device; retrieve, in response to the determination, subscriber configuration data for the subscriber device from a subscriber configuration network node responsible for storing subscriber configuration data for a plurality of subscriber devices; and transmit the subscriber configuration data for the subscriber device retrieved from the subscriber configuration network node to the network node.

According to a third embodiment, there is a method of processing data in a telecommunications network, the network comprising: a cluster of network nodes responsible for conducting registration procedures for subscriber devices and/or processing routing data relating to communication sessions conducted in the network; a subscriber configuration network node responsible for storing subscriber configuration data for a plurality of subscriber devices; and a cache comprising a shared cache store for caching subscriber configuration data for subscriber devices, the shared cache store being accessible by each of the network nodes in the cluster of network nodes, the method comprising, at the cache: receiving, from a network node in the cluster of network nodes, a registration request requesting registration of a subscriber device with the network; determining whether the shared cache store contains subscriber configuration data for the subscriber device; in the case of a positive determination, retrieving subscriber configuration data for the subscriber device from the shared cache store and transmitting the subscriber configuration data retrieved from the shared cache store to the network node; and in the case of a negative determination, retrieving subscriber configuration data for the subscriber device from the subscriber configuration network node, transmitting the subscriber configuration data retrieved from the subscriber configuration network node to the network node, and storing the subscriber configuration data retrieved from the subscriber configuration network node in the shared cache store.

Embodiments comprise a computer program product comprising a non-transitory computer-readable storage medium having computer readable instructions stored thereon, the computer readable instructions being executable by a computerized device to cause the computerized device to perform the method of the first or third embodiments.

Further features of embodiments will become apparent from the following description of preferred embodiments, given by way of example only, which is made with reference to the accompanying drawings.

DETAILED DESCRIPTION OF CERTAIN INVENTIVE EMBODIMENTS

In order to provide efficient scalability of a telephony network, embodiments do not employ a longstanding assignment of a given subscriber to a given network node. Instead, any network node among a plurality of network nodes is enabled to process messages relating to any given subscriber.

Figure 1:
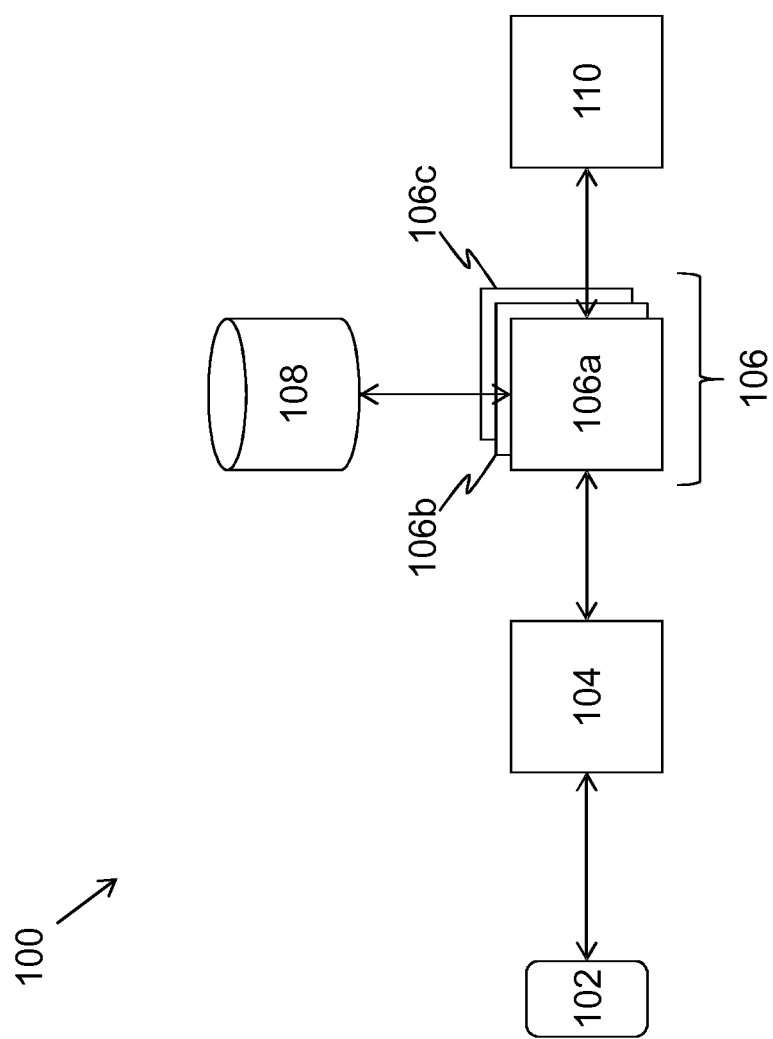
FIG. 1 shows an example telecommunications network in which one or more embodiments of the present disclosure may be practiced.

FIG. 1 illustrates an example telecommunications network 100 in which embodiments of the present disclosure may be practiced. Telecommunications network 100 comprises a plurality of network nodes 106, which are collectively responsible for conducting registration procedures for subscriber devices and/or processing routing data relating to communication sessions conducted in telecommunications network 100. In this manner, the plurality of network nodes 106 may be referred to as a cluster of network nodes. The cluster of network nodes 106 may comprise nodes performing the functions of one or more CSCFs, SIP Routers, SIP Registrars, SIP Service Nodes, SIP Proxies etc. In FIG. 1, the plurality of network nodes 106 is depicted as comprising three network nodes 106a, 106b and 106c. In practice, the plurality of network nodes 106 may comprise further network nodes (not shown), or fewer than the three depicted network nodes.

Subscriber device 102 is configured to conduct telephony sessions via telecommunications network 100. Subscriber device 102 communicates with telecommunications network 100 via edge proxy node 104. The communication link between subscriber device 102 and edge proxy node 104 may further comprise one or more intermediate entities, such as wireless access points, routing devices etc. Edge proxy node 104 may be further responsible for interfacing between telecommunications network 100 and one or more further subscriber devices (not shown). Telecommunications network 100 may also comprise one or more further edge proxy nodes (not shown), each responsible for interfacing between telecommunications network 100 and a number of yet further subscriber devices (not shown). For example, each further edge proxy node may provide access to telecommunications network 100 for subscriber devices in different geographic locations.

The network nodes in the plurality of network nodes in cluster 106 are each configured to access shared registration data store 108 for reading and writing registration data relating to subscribers in telecommunications network 100. Shared registration data store 108 comprises registration data for a plurality of subscriber devices registered with telecommunications network 100, including subscriber device 102, and is accessible by each of the plurality of network nodes in cluster 106. Network nodes 106 are also configured to communicate with entities outside of telecommunications network 100 (i.e. entities in different telecommunications networks; not shown) via border entity 110. In the context of IMS, border entity 110 may, for example, comprise one or more of a Media Gateway Control Function (MGCF) or Interconnection Border Control Function (IBCF).

Figure 2:
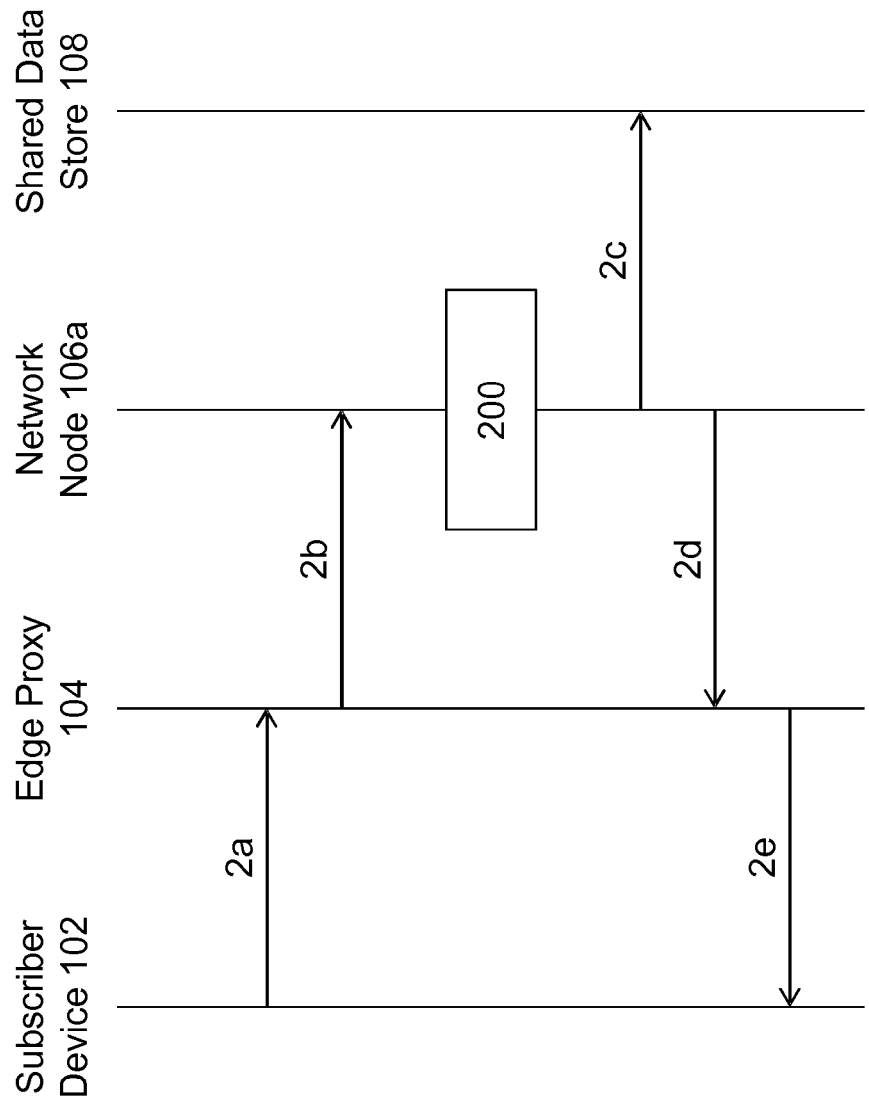
FIG. 2 shows an example registration procedure according to one or more embodiments of the present disclosure.

FIG. 2 illustrates an example registration procedure according to embodiments. A registration request message 2a is initially sent from subscriber device 102 to edge proxy node 104. In embodiments, registration request message 2a comprises registration data for subscriber device 102. In the case of SIP, registration request message 2a may, for example, comprise a SIP REGISTER request. Transmission of the registration request message may be preceded by establishment (not shown) of a communication channel, for example via the Transmission Control Protocol (TCP), the User Datagram Protocol (UDP) or Websocket, between subscriber device 102 and edge proxy 104.

In response to receiving registration request message 2a, edge proxy 104 allocates the registration request to one of the plurality of network nodes 106, in this case network node 106a. In some embodiments, the choice of network node is made randomly by edge proxy 104. In further embodiments, the choice of network node is made according to one or more load balancing criteria in order to distribute network load across the plurality of network nodes in the cluster 106. In embodiments, the one or more load balancing criteria allow the registration request message to be handled by any of the plurality of network nodes in the cluster 106. The registration request message is then forwarded to the allocated network node 106*a* as registration request message 2*b*. Edge proxy 104 may modify the registration request message prior to forwarding it by adding identification information for edge proxy 104 to registration request message 2*b*. Upon receipt of registration request message 2*b*, network node 106*a* may perform an authentication procedure as shown by step 200. Such an authentication procedure may comprise contacting a subscriber configuration network node responsible for authenticating subscriber devices in telecommunications network 100. In the case of IMS, the subscriber configuration network node may, for example, comprise a Home Subscriber Server (HSS).

Having authenticated (if appropriate) the subscriber device 102, network node 106*a* writes the registration data from the received registration request message 2*b* into shared registration data store 108 at step 2*c*. In alternative embodiments, prior to writing the registration data into shared registration data store 108, network node 106*a* may first retrieve registration data for the given subscriber from the shared data store, update the retrieved registration data with the received registration data for that subscriber, and then write the updated registration data back to the shared data store.

Having written the subscriber data to the shared data store, registration confirmation (or 'registration response') message 2*d* is transmitted from network node 106*a* to edge proxy 104 (which may be identified by the added identification information in registration request message 2*b*). The registration confirmation message is then forwarded by edge proxy 104 to subscriber device 102 as registration confirmation message 2*e*, thereby completing the registration procedure.

In embodiments, the registration procedure is used to establish a relationship (or "binding") between a subscriber identifier and a network address for subscriber device 102. In embodiments, the subscriber identifier comprises a SIP address. In embodiments, the network address comprises one or more of an Internet Protocol (IP) address and a port associated with the subscriber device. Routing path information may also be registered during a registration procedure if required to successfully reach subscriber device 102 (for example to traverse any intermediate network address translation (NAT) entities). The registration data comprised in registration request message 2*a* may, for example, comprise one or more of the subscriber identifier, the network address for subscriber device 102 and path information.

In embodiments, the subscriber device may be required to perform a periodic re-registration procedure in order to maintain its registration. In some such embodiments, the stored registration data may expire after a predetermined period of time (for example after a previous registration procedure). The re-registration procedure may, for example, comprise the same steps as the aforementioned registration procedure. In embodiments, the authentication procedure is performed during the initial registration procedure, but omitted in each subsequent re-registration procedure. In alternative embodiments, the authentication procedure is performed during both the initial registration and one or more subsequent re-registration procedures. In embodiments, since the registration information for subscriber device is stored in shared data store 108, subsequent re-registration requests relating to subscriber device 102 may be handled by any network node in the cluster of network nodes 106. In arrangements where the registration request message 2*b* is handled by network node 106*a*, a subsequent re-registration request is handled by a different network node in the cluster 106 (for example, network node 106*b*).

In some embodiments, multiple subscriber devices may be registered against the same subscriber identifier simultaneously. In some such embodiments, shared registration data store 108 comprises registration and/or binding information for each registered subscriber device. In some embodiments, two or more of the multiple registered subscriber devices correspond to two or more clients located on the same client device; in such embodiments, the two or more clients located on the same client device may be referred to as collocated.

Figure 3:
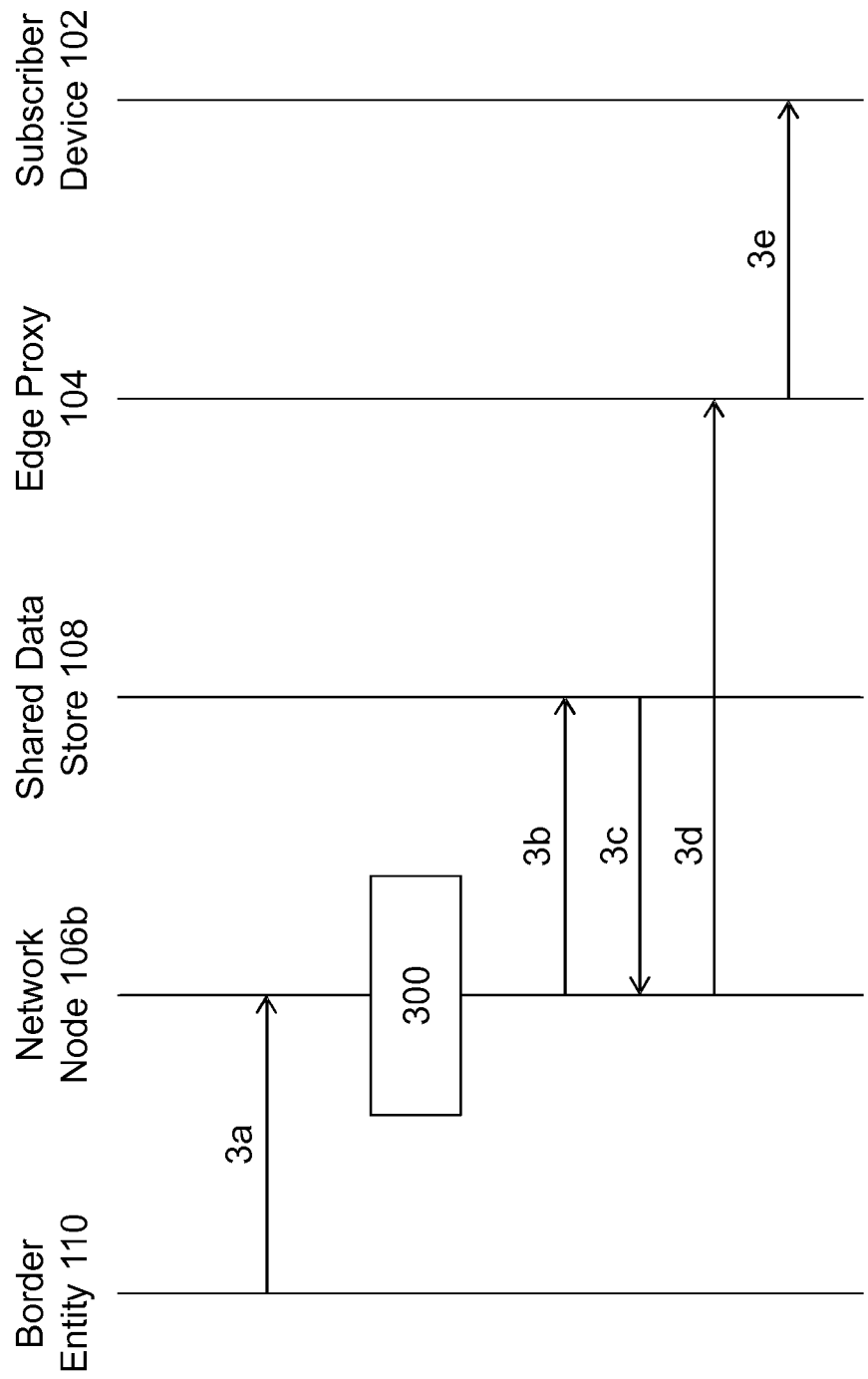
FIG. 3 shows an example communication setup request procedure according to one or more embodiments of the present disclosure.

FIG. 3 illustrates an example communication setup request procedure according to embodiments. In the example depicted in FIG. 3, a communication session setup request message (hereinafter a dialog request message) relating to subscriber device 102 is received from outside of telecommunications network 100 at border entity 110. In the case of SIP, the dialog request message may comprise a SIP INVITE message, used in establishing a communication session between two subscriber devices. In further embodiments, the dialog request message may comprise a SIP MESSAGE message, a SIP SUBSCRIBE message or a SIP PUBLISH message. Border entity 110 allocates the dialog request message request to one of the plurality of network nodes 106, in this case network node 106*b*. In some embodiments, the choice of network node is made randomly by border entity 110. In further embodiments, the choice of network node is made according to one or more load balancing criteria in order to distribute network load across the plurality of network nodes in cluster 106. In embodiments, the one or more load balancing criteria allow the dialog request message to be handled by any of the plurality of network nodes in the cluster 106. As a result, the dialog request message is forwarded to the allocated network node 106*b* as dialog request message 3*a*. In alternative embodiments (not shown), the incoming dialog request message originates from a further subscriber device within telecommunications network 100, in which case, the dialog request message is allocated and forwarded to a network node in the cluster of network nodes 106 by whichever edge proxy the further subscriber device is in communication with.

Having received dialog request message 3*a*, network node 106*b* inspects the received dialog request to determine which subscriber device the dialog request relates to (in this case subscriber device 102). Network node 106*b* may determine one or more filter criteria to apply to the dialog request (for example, to determine whether application servers should be invoked), as shown by step 300. Determination of any such filter criteria may comprise contacting a subscriber configuration network node responsible for storing subscriber configuration data in telecommunications network 100. In the case of IMS, the subscriber configuration network node may, for example, comprise an HSS.

Having determined and/or applied any necessary filter criteria, the routing proxy queries shared registration data store 108 for registration data for subscriber device 102 via request message 3*b*. As a result of a previous registration procedure (for example, as described in relation to FIG. 2), shared registration data store 108 comprises registration data for subscriber device 102, and returns this to network node 106*b* in response message 3*c*. Having retrieved the registration data for subscriber device 102 from the shared registration data store, network node 106*b* can continue to process the dialog request by routing the dialog request message, on the basis of the retrieved registration data for subscriber device 102, to the appropriate edge proxy 104 as dialog request message 3*d*. Edge proxy 104 then forwards the dialog request message to subscriber device 102 as dialog request message 3*e*. In some embodiments, in response to routing the dialog request message to the appropriate edge proxy 104, network node 106b also updates (not shown) the registration data for subscriber device 102 in shared registration data store 108.

Hence, it can be seen that by utilizing shared registration data store 108, the requirement for a longstanding association between subscriber device 102 and a given network node in the cluster of network nodes 106 is removed, and request messages may be routed to/from subscriber device 102 by any available network node in the cluster 106.

In embodiments, the retrieved registration data listing the appropriate edge proxy 104 may be out of date (for example, if the subscriber device has since disconnected form the network). In such embodiments, the edge proxy 104 may respond to dialog request message 3d by sending a request rejection message (not shown) back to network node 106b indicating that the registration information is out of date. In some such embodiments, in response to receipt of the request rejection message, network node 106b updates the registration data for subscriber device 102 in shared registration data store 108.

In embodiments, shared registration data store 108 further comprises registration data for one or more further subscriber devices associated with the subscriber of subscriber device 102. In such embodiments, registration data for each further subscriber device associated with the subscriber of subscriber device 102 is returned to network node 106b in the response message from shared data store 108. Dialog request messages may then be forwarded to each of these further subscriber devices in addition to subscriber device 102 (via the appropriate edge proxies).

In some arrangements, shared registration data store 108 comprises a clustered registration data store, wherein the data store is distributed among a number of nodes in telecommunications network 100. In embodiments, the registration data stored in shared registration data store 108 is distributed among the cluster of network nodes 106. In such embodiments, a portion of the registration data stored in shared registration data store 108 is stored in memory at two or more or each network node in the cluster of network nodes 106. In embodiments, a first portion of the registration data is stored in memory at network node 106a, and a second, different portion of the registration data is stored in memory at network node 106b.

Hence, during processing at a given network node in the cluster of network nodes 106, any registration data that may be required can be stored either locally at the given network node or remotely on a different network node in the cluster 106. Hence the aforementioned write, request and/or response messages sent to and received from shared registration data store 108 may be sent and received within the given network node, or transmitted externally from the given network node to another node in the cluster, depending on the location of the required registration data. In embodiments, the shared registration data store comprises a distributed memory system such as Memcached™, Infinispan™ or Cloudbase™.

As described in relation to FIGS. 2 and 3 above, the data processing responsibilities of the cluster of network nodes 106 may comprise contacting a subscriber configuration network node, such as an HSS in the case of IMS. In a conventional telecommunications network, where a longstanding relationship is set up between a given subscriber device and a given network node during a registration procedure, subscriber configuration data retrieved from such a subscriber configuration network node may be stored locally by the given network node in order to prevent successive calls to the subscriber configuration network node if subscriber configuration data for the given subscriber device is required again subsequently. However, as there is no such longstanding relationship in the new architectural arrangement of the present disclosure, storing of data retrieved from the subscriber configuration network node by a network node in the cluster 106 may be inefficient, as the next time the data will likely be required by a different network node. Hence, the new architectural arrangement of the present disclosure may lead to an increase in the frequency of queries to subscriber configuration network nodes. Such an increase in queries to a subscriber configuration network node may negatively impact the performance of the subscriber configuration network node, for example by overloading access resources to/from and/or processing capabilities of the subscriber configuration network node. The new architectural arrangement of the present disclosure may be additionally or alternatively facilitated through the use of a cache comprising a shared cache store for caching subscriber configuration data for subscriber devices.

Figure 4:
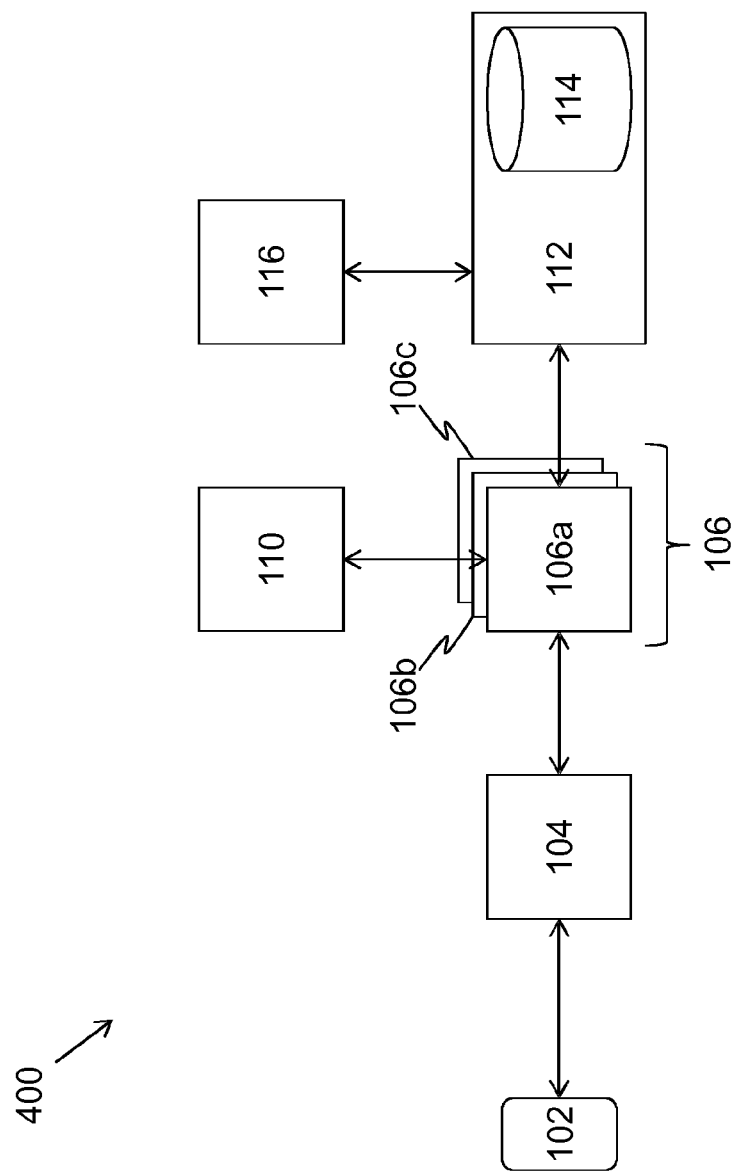
FIG. 4 shows an example telecommunications network in which one or more embodiments of the present disclosure may be practiced.

FIG. 4 illustrates an example telecommunications network 400 in which embodiments of the present disclosure may be practiced. Telecommunications network 400 comprises subscriber device 102, edge proxy node 104, a cluster of network nodes 106 (comprising network nodes 106a, 106b and 106c) and border entity 110, whose function is analogous to the corresponding entities as previously described in relation to FIG. 1. In telecommunications network 400, the plurality of network nodes in cluster 106 are also configured to communicate with cache 112, which comprises a shared cache store 114 for caching subscriber configuration data for subscriber devices in telecommunications network 400. Cache 112 is configured to communicate with subscriber configuration network node 116, which is responsible for storing subscriber configuration data for subscriber devices in telecommunications network 400 (including subscriber device 102). In the case of IMS, subscriber configuration network node 116 may comprise an HSS. In embodiments, the interface between cache 112 and the HSS comprises a Cx interface, as defined in the IMS specifications.

Figure 5:
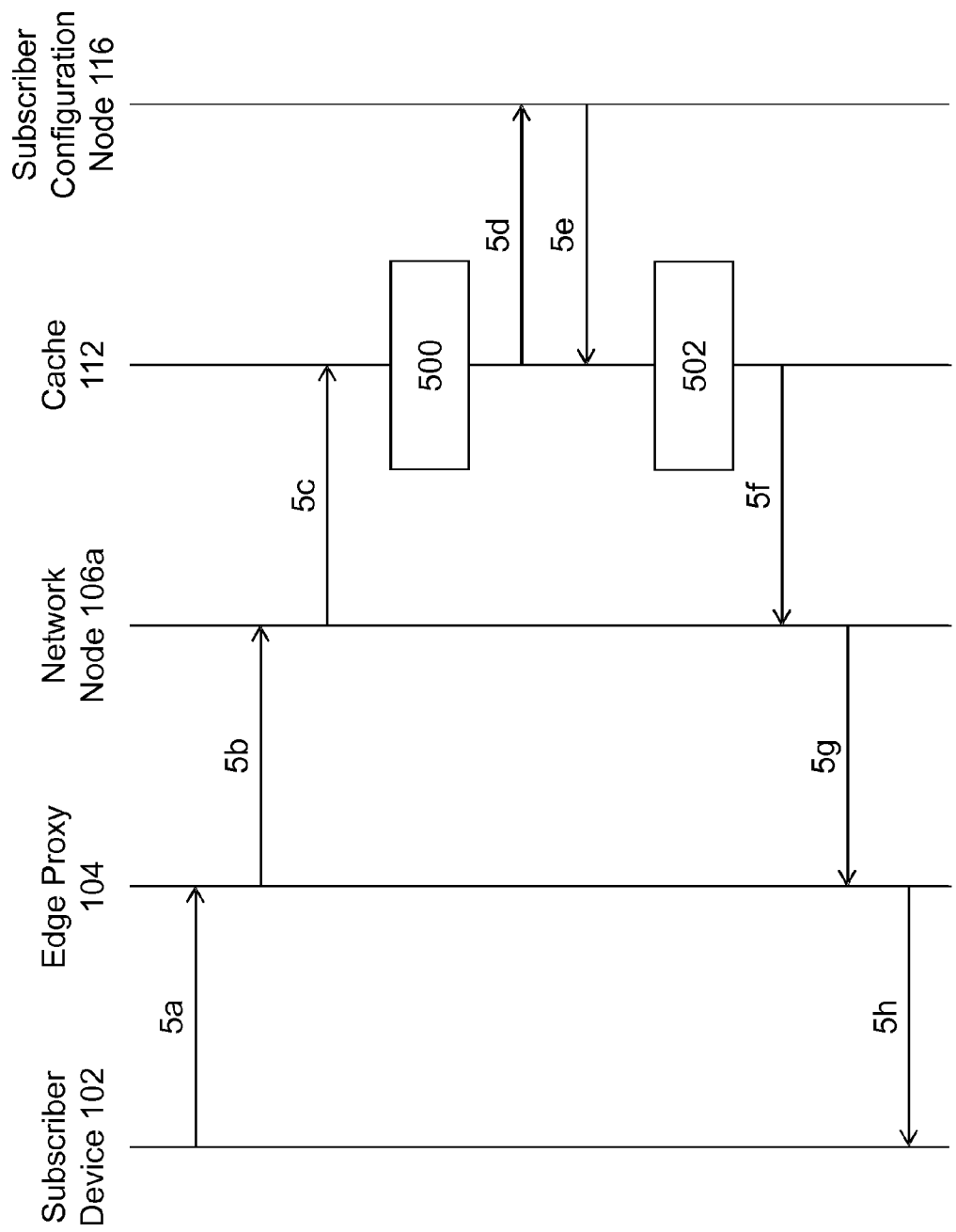
FIG. 5 shows an example subscriber configuration data retrieval procedure according to one or more embodiments of the present disclosure.

FIG. 5 illustrates an example subscriber configuration data retrieval procedure according to embodiments. In the embodiment shown in FIG. 5, a subscriber configuration data retrieval procedure is carried out as part of a registration procedure relating to subscriber device 102, such as the one described previously in relation to FIG. 2. A registration request message 5a is initially sent from subscriber device 102 to edge proxy node 104. In embodiments, registration request message 5a comprises registration data for subscriber device 102. In the case of SIP, registration request message 5a may for example comprise a SIP REGISTER request. Transmission of the registration request message may be preceded by establishment of a communication channel, for example via the Transmission Control Protocol (TCP), the User Datagram Protocol (UDP) or Websocket, between subscriber device 102 and edge proxy 104 (not shown).

In response to receiving registration request message 5a, edge proxy 104 allocates the registration request to one of the plurality of network nodes 106, in this case network node 106a. In some embodiments, the choice of network node is made randomly by edge proxy 104. In further embodiments, the choice of network node is made according to one or more load balancing criteria in order to distribute network load across the plurality of network nodes in the cluster 106. In embodiments, the one or more load balancing criteria enable handling of the registration request message by any of the plurality of network nodes in the cluster 106. The registration request message is then forwarded to the allocated network node 106a as registration request message 5b. In embodiments, edge proxy 104 maintains a pool of TCP connections each corresponding to one of the plurality of network nodes in cluster 106, where registration request message 5b is transmitted via the TCP connection corresponding to the allocated network node 106a. In embodiments, edge proxy 104 modifies the registration request message 5b prior to forwarding it by adding identification information for edge proxy 104. Upon receipt of registration request message 5b, network node 106a is configured to perform an authentication procedure, which may, for example, comprise issuing one or more authentication challenge messages to subscriber device 102 and receiving one or more authentication responses from subscriber device 102 (not shown), depending on the authentication scheme chosen. In some embodiments, the authentication procedure comprises a SIP digest authentication. In further embodiments, the authentication comprises IMS Authentication and Key Agreement (AKA) authentication. In order to complete the authentication procedure, network node 106a requires subscriber configuration data for subscriber device 102. Network node 106a transmits a subscriber configuration data request 5c to cache 112 in relation to subscriber device 102, on the basis of information received in registration request message 5b.

In response to receipt of subscriber configuration data request 5c, cache 112 determines whether the shared cache store contains subscriber configuration data for subscriber device 102 at step 500. In the embodiments depicted in FIG. 5, cache 112 determines that shared cache store 114 does not contain subscriber configuration data for subscriber device 102. In response to determining that shared cache store 114 does not contain subscriber configuration data for subscriber device 102 at step 500, cache 112 retrieves subscriber configuration data for subscriber device 102 from subscriber configuration network node 116. Cache 112 transmits subscriber configuration data request 5d to subscriber configuration network node 116 in relation to subscriber device 102 and receives corresponding subscriber configuration data response 5e which comprises subscriber configuration data for subscriber device 102. In embodiments, subscriber configuration data request 5d and corresponding subscriber configuration data response 5e comprise a Multimedia-Auth-Request and a Multimedia-Auth-Answer respectively (as defined in the IMS specifications). In response to receipt of subscriber configuration data response 5e, cache 112 responds to subscriber configuration data request 5c by transmitting subscriber configuration data retrieval response 5f, which comprises the subscriber configuration data for subscriber device 102, to network node 106a.

In embodiments, the subscriber configuration data for subscriber device 102 comprises authentication data for subscriber device 102. Having received the authentication data for subscriber device 102, network node 106a can complete the authentication procedure with subscriber device 102 as described above. Having completed the authentication procedure for subscriber device 102, the registration procedure may be continued by network node 106a, for example by updating registration information for subscriber device 102 on the basis of the contents of received registration request message 5b (as described previously in relation to FIG. 2). Once network node 106 has finished processing the registration request, registration confirmation message 5g is transmitted from network node 106a to edge proxy 104 (which may be identified by the added identification information in registration request message 5b). The registration confirmation message 5g is then forwarded by edge proxy 104 to subscriber device 102 as registration confirmation message 5h, thereby completing the registration procedure.

Hence, subscriber configuration network node 116 need only be contacted if the required subscriber configuration data is not contained in shared cache store 114. In some embodiments, prior to transmitting subscriber configuration data retrieval response 5f, cache 112 writes the subscriber configuration data for subscriber device 102 received in subscriber configuration data retrieval response 5e into shared cache store 114, as shown by step 502. Hence, a subsequent request for subscriber configuration data for subscriber device 102 may be fulfilled without having to re-query subscriber configuration network node 116. In this manner, the number of queries to subscriber configuration network node 116 is reduced, thereby alleviating any negative impact on the performance of subscriber configuration network node 116 which may for example result from overloading of access resources to/from and/or processing capabilities of the subscriber configuration network node 116.

Whilst in the embodiments described in relation to FIG. 5, the required subscriber configuration data for subscriber device 102 was not contained in shared cache store 114, in alternative embodiments, the required subscriber configuration data for subscriber device 102 is contained in shared cache store 114, for example as a result of a previous caching procedure. In such cases, the required subscriber configuration data for subscriber device 102 is retrieved from shared cache store 114 instead, and may therefore be transmitted to network node 106a without the need to query subscriber configuration network node 116 again.

In embodiments, subscriber device 102 may be required to perform a periodic re-registration procedure in order to maintain its registration. In some such embodiments, the authentication procedure is not performed during re-registration procedure following an initial registration procedure in which the authentication procedure was successfully completed. In alternative embodiments, the authentication procedure is performed during both the initial registration and subsequent re-registration procedures.

In some embodiments, such as when the interface between cache 112 and subscriber configuration network node 116 is a Cx interface according to the IMS specifications, the interface between cache 112 and subscriber configuration network node 116 facilitates a registration in relation to the requested subscriber registration data. In such embodiments, after subscriber data for subscriber device 102 is retrieved from subscriber configuration network node 116 by cache 112, any updates made to the subscriber configuration data stored in subscriber configuration network node 116 are notified to cache 112 through the transmission of a notification from subscriber configuration network node 116 to cache 112. In embodiments, the notification comprises the updated subscriber configuration data for subscriber 102. In alternative embodiments, cache 112 retrieves the updated subscriber configuration data for subscriber 102 from subscriber configuration network node 116 in response to receipt of the notification. In embodiments the updated subscriber configuration data comprises one or more of subscriber profile information and one or more initial filter criteria. In embodiments, in response to receipt of the updated subscriber configuration data for subscriber 102, cache 112 stores the updated subscriber configuration data for subscriber 102 in shared cache store 114. Hence, subsequent requests for subscriber configuration data for subscriber 102 received at cache 112 return the updated subscriber configuration data for subscriber 102. In some embodiments, there is a limited period of time in which subscriber configuration network node 116 will notify cache 112 of changes made to the subscriber configuration data stored at subscriber configuration network node 116 in relation to subscriber device 102 following the retrieval of the subscriber configuration data. In embodiments, the expiry time of this time period is stored alongside the corresponding subscriber configuration data in shared cache store 114. According to embodiments, after the expiration of this registration, the corresponding subscriber configuration data in the shared cache store 114 is also expired, such that any subsequent request for that subscriber configuration data results in a new query being sent from cache 112 to subscriber configuration network node 116, and does not return the potentially outdated (i.e. expired) subscriber configuration data from shared cache store 114.

In embodiments, the subscriber configuration data retrieved from subscriber configuration network node 116 and/or stored in shared cache store 114 comprises one or more initial filter criteria (IFC). An initial filter criteria represents a subscription of a subscriber to a given application, and may, for example, define a specific application server that should be invoked in relation to communication sessions with the given subscriber device. In embodiments, the subscriber configuration data retrieved from subscriber configuration network node 116 and/or stored in shared cache store 114 comprises subscriber profile information. Subscriber profile information may for example include user related data, group lists, user service related information, user location information and/or charging information.

Figure 6:
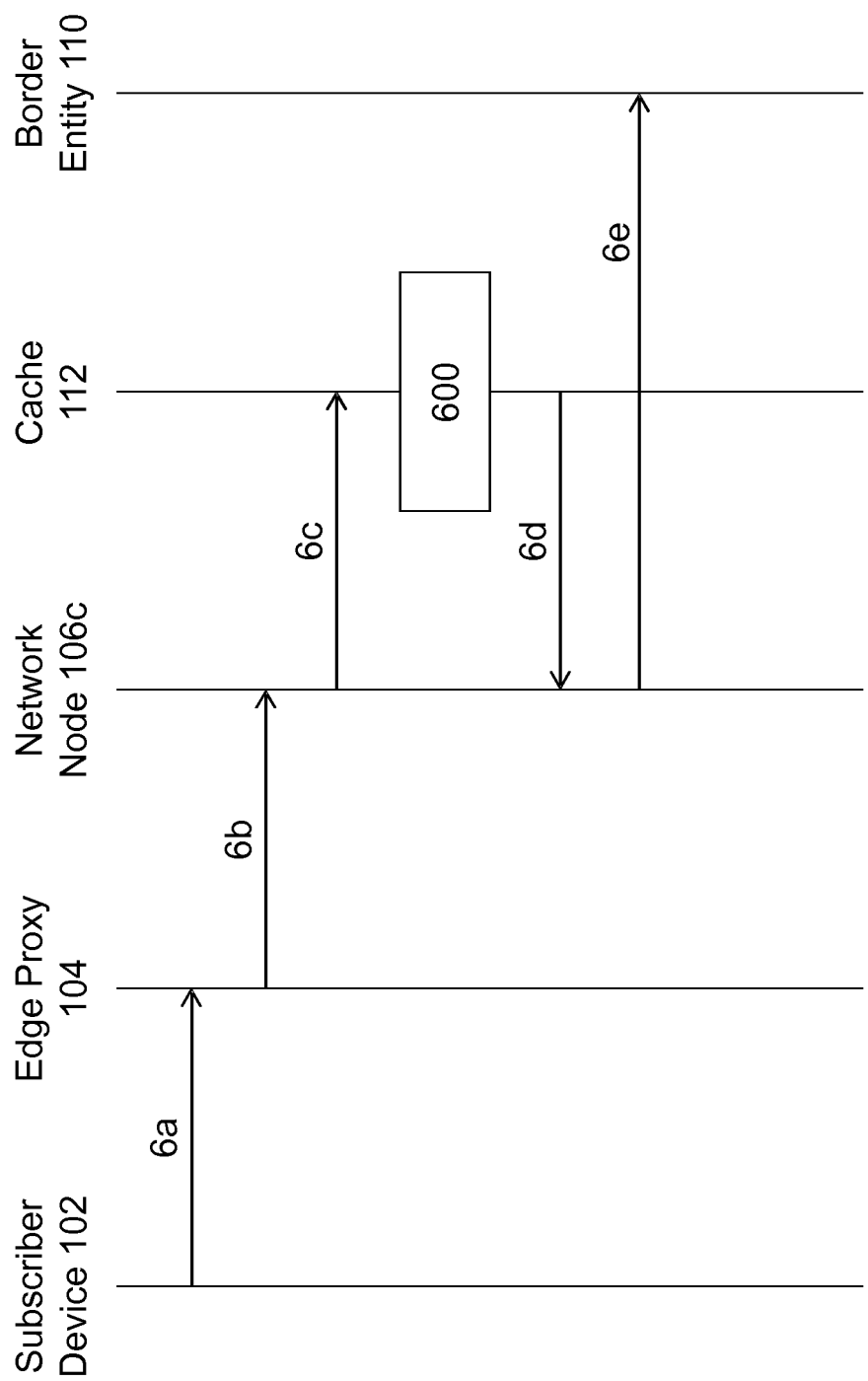
FIG. 6 shows an example subscriber configuration data retrieval procedure according to one or more embodiments of the present disclosure.

FIG. 6 illustrates an example subscriber configuration data retrieval procedure according to embodiments. In the embodiment shown in FIG. 6, the subscriber configuration data retrieval procedure is carried out as part of a communication session setup procedure between subscriber device 102 and a remote subscriber device (not shown) within or outside telecommunications network 400. A communication session setup request message 6a (hereinafter a dialog request message) is transmitted from subscriber device 102 to edge proxy 104. In the case of SIP, the dialog request message may comprise a SIP INVITE message, used in establishing a communication session between two (or more) subscriber devices. Edge proxy 104 allocates the dialog request to one of the plurality of network nodes 106, in this case network node 106c. In some embodiments, the choice of network node is made randomly by edge proxy 104. In further embodiments, the choice of network node is made according to one or more load balancing criteria in order to distribute network load across the plurality of network nodes in the cluster 106. In embodiments, the one or more load balancing criteria enable handling of the dialog request message by any of the plurality of network nodes in the cluster 106. As a result, the dialog request message is forwarded to the allocated network node 106c as dialog request message 6b.

Having received dialog request message 6b, network node 106b inspects the received dialog request to determine which subscriber the dialog request relates to (in this case the subscriber of subscriber device 102). Network node 106c then performs a filtering procedure to determine and/or apply one or more initial filter criteria to the dialog request. In order to complete the filtering procedure, network node 106c requires subscriber configuration data for subscriber device 102. Network node 106c transmits a subscriber configuration data retrieval request 6c to cache 112 in relation to subscriber device 102, on the basis of information received in dialog request message 6b.

In response to receipt of subscriber configuration data retrieval request 6c, the cache determines whether the shared cache store contains subscriber configuration data for subscriber device 102 at step 600. In the embodiments depicted in FIG. 6, cache 112 determines that shared cache store 114 does contain subscriber configuration data for subscriber device 102, for example as a result of a recent/previous registration procedure carried out in relation to subscriber device 102. In embodiments, the previous registration processing was performed by a network node in cluster 106 other than network node 106c. In response to determining that shared cache store 114 does contain subscriber configuration data for subscriber device 102 at step 600, cache 112 retrieves subscriber configuration data for subscriber device 102 from shared cache store 114 and transmits the retrieved subscriber configuration data to network node 106c in subscriber configuration data retrieval response 6d.

In embodiments, the retrieved subscriber configuration data for subscriber device 102 comprises initial filter criteria for subscriber device 102. Having received the initial filter criteria for subscriber device 102, network node 106c can complete the filtering procedure for the dialog request by applying any necessary filters and/or invoking any required application servers etc. as described above. Having completed the filtering procedure for subscriber device 102, processing of the communication session setup can be continued by network node 106c, for example through transmission of dialog request message 6e from network node 106c to border entity 110 (which may then forward the dialog request message to one or more further entities within or outside of telecommunications network 400, including the remote subscriber device).

Hence, as the required subscriber configuration data for subscriber device 102 is contained in shared cache store 114, a further query to subscriber configuration network node 116 is avoided. Whilst in the embodiments described in relation to FIG. 6, the required subscriber configuration data for subscriber device 102 was contained in shared cache store 114, in alternative embodiments, the required subscriber configuration data for subscriber device 102 is not contained in shared cache store 114, in which case it is retrieved from subscriber configuration network node 116 as described previously in relation to FIG. 5. In some embodiments, the required subscriber configuration data for a communication session setup procedure is retrieved by cache 112 from subscriber configuration network node 116 via a Server-Assignment-Request message and a Server-Assignment-Answer message (as defined in the IMS specifications) transmitted to and received from subscriber configuration network node 116 respectively. In further embodiments, the required subscriber configuration data for subscriber device 102 contained within shared cache store 114 may have expired (i.e. an expiry time associated with the subscriber configuration data has expired), in which case it is retrieved from subscriber configuration network node 116 as described above. In embodiments, in response to retrieving the subscriber configuration data for subscriber device 102 from subscriber configuration network node 116, the associated expiry time for newly retrieved subscriber configuration data for subscriber device 102 is reset.

Figure 7:
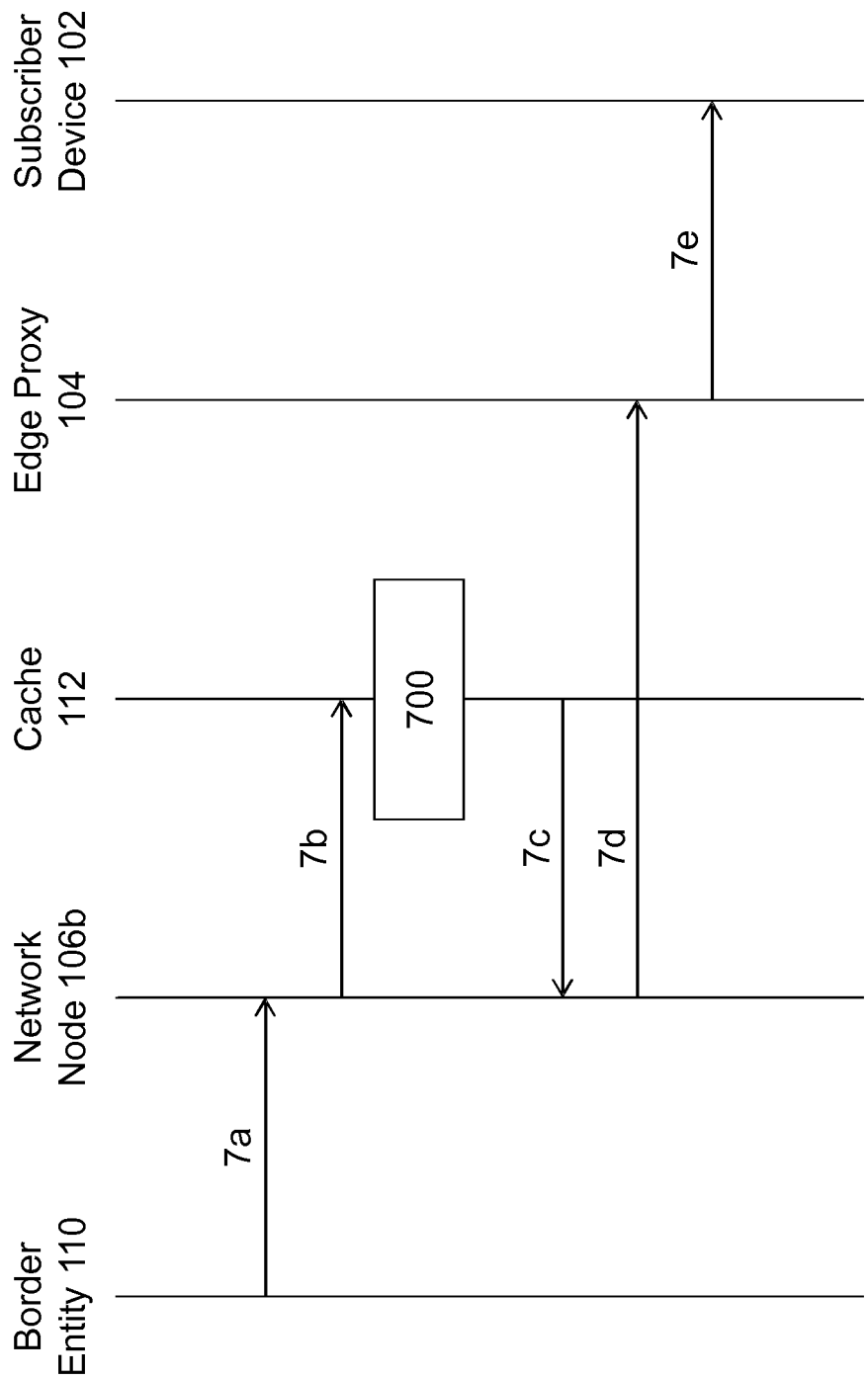
FIG. 7 shows an example subscriber configuration data retrieval procedure according to one or more embodiments of the present disclosure.

FIG. 7 illustrates an example subscriber configuration data retrieval procedure according to embodiments. In the embodiment shown in FIG. 7, the subscriber configuration data retrieval procedure is carried out as part of a communication session setup procedure from a remote subscriber device (not shown) outside telecommunications network 400 to subscriber device 102. A dialog request message relating to subscriber device 102 is received from outside telecommunications network 400 at border entity 110. Border entity 110 allocates the dialog request message request to one of the plurality of network nodes 106, in this case network node 106b. In some embodiments, the choice of network node is made randomly by border entity 110. In further embodiments, the choice of network node is made according to one or more load balancing criteria in order to distribute network load across the plurality of network nodes in the cluster 106. In embodiments, the one or more load balancing criteria enable handling of the dialog request message by any of the plurality of network nodes in the cluster 106. As a result, the dialog request message is forwarded to the allocated network node 106b as dialog request message 7a. In alternative embodiments (not shown), the incoming dialog request message may originate from a further subscriber device within telecommunications network 400, in which case, the dialog request message is allocated and forwarded to a network node in the cluster of network nodes 106 by whichever edge proxy is associated with the further subscriber device.

Having received dialog request message 7a, network node 106b inspects the received dialog request to determine which subscriber the dialog request relates to (in this case the subscriber of subscriber device 102). Network node 106b then performs a filtering procedure to determine and/or apply one or more initial filter criteria to the dialog request. In order to complete the filtering procedure, network node 106b requires subscriber configuration data for subscriber device 102. Network node 106b transmits a subscriber configuration data retrieval request 7b to cache 112 in relation to subscriber device 102, on the basis of information received in dialog request message 7a.

In response to receipt of subscriber configuration data retrieval request 7b, cache 112 determines whether the shared cache store contains subscriber configuration data for subscriber device 102 at step 700. In the embodiments depicted in FIG. 7, cache 112 determines that shared cache store 114 does contain subscriber configuration data for subscriber device 102, for example as a result of a recent registration procedure carried out in relation to subscriber device 102. In embodiments, the registration procedure was performed by a network node in cluster 106 other than network node 106b. In response to determining that shared cache store 114 does contain subscriber configuration data for subscriber device 102 at step 700, cache 112 retrieves subscriber configuration data for subscriber device 102 from shared cache store 114 and transmits the retrieved configuration data to network node 106b in subscriber configuration data retrieval response 7c.

In embodiments, the subscriber configuration data for subscriber device 102 comprises initial filter criteria for subscriber device 102. Having received the initial filter criteria for subscriber device 102, network node 106b can complete the filtering procedure for the dialog request by applying any necessary filters and/or invoking any required application servers etc. as described above. Having completed the filtering procedure for subscriber device 102, processing of the communication session setup can be continued, by retrieving registration data for subscriber device 102 (for example as described previously in relation to FIG. 3). Having retrieved registration data for subscriber device 102, network node 106b transmits dialog request message 7d to the appropriate edge proxy (for example as identified in the retrieved registration data), in this case edge proxy 104. Edge proxy 104 continues the communication session setup procedure by forwarding the dialog request message to subscriber device 102 as dialog request message 7e.

Again, as the required subscriber configuration data for subscriber device 102 is contained in shared cache store 114, a query to subscriber configuration network node 116 has been avoided. Whilst in the embodiments described in relation to FIG. 7, the required subscriber configuration data for subscriber device 102 was contained in shared cache store 114, in alternative embodiments, the required subscriber configuration data for subscriber device 102 is not contained in shared cache store 114, in which case it can be retrieved from subscriber configuration network node 116 as described previously in relation to FIGS. 5 and 6.

In embodiments, shared cache store 114 comprises a clustered cache store, wherein the subscriber configuration data comprised in shared cache store 114 is distributed among a number of nodes in telecommunications network 400. In embodiments, the subscriber configuration data stored in shared cache store 114 is distributed among the cluster of network nodes 106. In such embodiments, a portion of the subscriber configuration data stored in shared cache store 114 is stored in memory at two or more or each network node in the cluster of network nodes 106. In embodiments, a first portion of the registration data stored in memory at network node 106a, and a second, different portion of the registration data is stored in memory at network node 106b.

Hence, during processing at a given network node in the cluster of network nodes 106, any subscriber configuration data that may be required may be stored either locally at the given network node or remotely on a different network node in the cluster 106. Hence the aforementioned write, request and/or response messages sent to and received from shared cache store 114 may be sent and received within the given network node, or transmitted externally from the given network node to another node in the cluster, depending on the location of the required registration data. In embodiments, the shared registration data store comprises a key-value data store, for example Apache Cassandra™.

Figure 8:
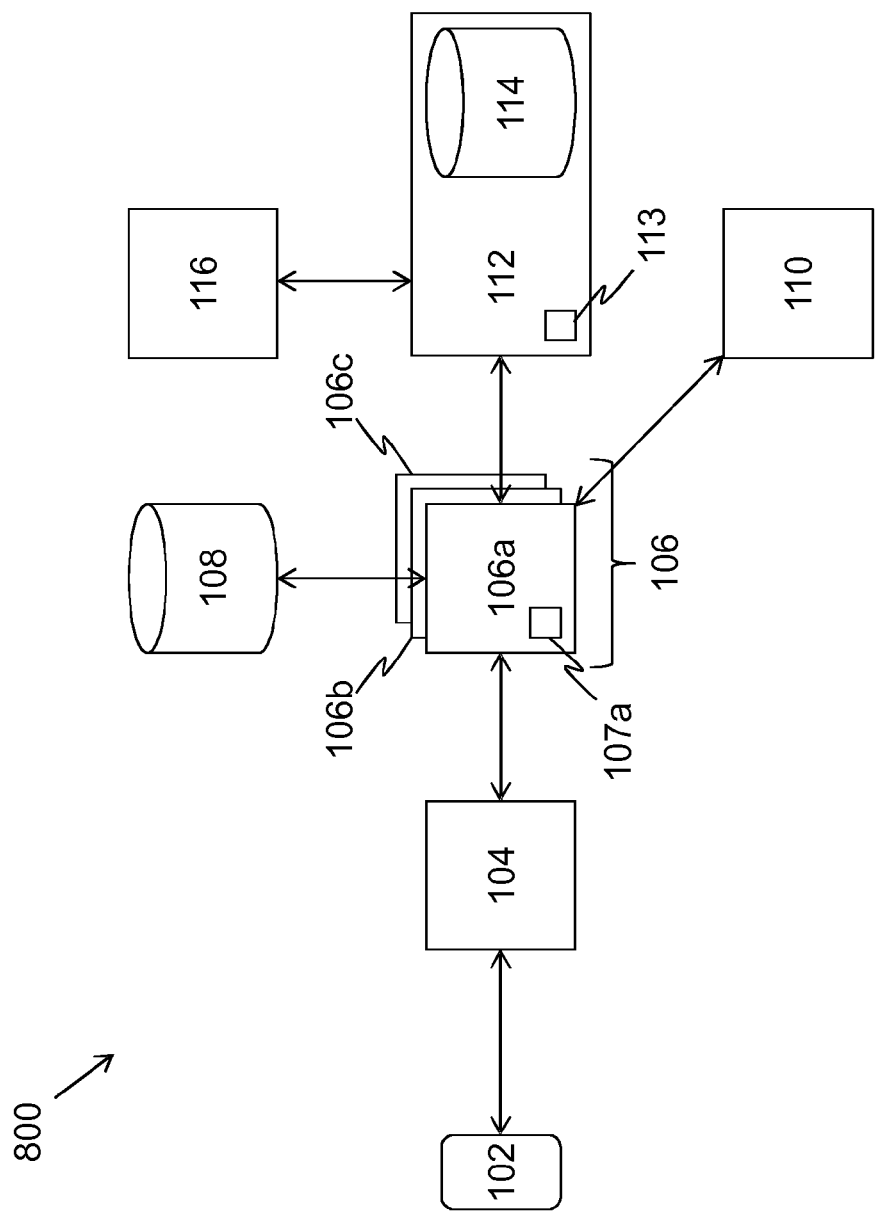
FIG. 8 shows an example telecommunications network in which one or more embodiments of the present disclosure may be practiced.

FIG. 8 illustrates an example telecommunications network 800 in which embodiments of the present disclosure may be practiced. Telecommunications network 800 comprises subscriber device 102, edge proxy node 104, cluster of network nodes 106 (comprising network nodes 106a, 106b and 106c), shared registration data store 108 and border entity 110, whose functions are analogous to the corresponding entities as previously described in relation to FIG. 1, as well as cache 112, shared cache store 114 and subscriber configuration network node 116, whose functions are analogous to the corresponding entities as previously described in relation to FIG. 4. In embodiments, each network node in the plurality of network nodes 106 comprises a processor or processing system, as depicted by processor 107a comprised within network node 106a. In further embodiments, cache 112 comprises processor or processing system 113. Each network node and/or cache as described in relation to any of the embodiments described above may similarly comprise a processor and/or processing system.

One or more of the aspects of the embodiments described herein with reference to the drawings comprise processes performed by one or more network nodes 106 and/or cache 112. In embodiments, the one or more network nodes 106 and/or cache 112 comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The distributed nodes discussed in the above embodiments, such as clustered network nodes 100, the distributed shared registration data store and/or the distributed shared cache store may be distributed across a number of systems, either real physical systems or virtual machines, such as those comprised within a virtualized data center or public or private cloud. In this way the system can scale horizontally to support a large number of users. In embodiments, each network node in cluster 106 may each provide both SIP registrar and SIP routing proxy functions. In alternative embodiments, separate subsets of nodes may be provided for each of these functions, wherein both subsets are configured to access the shared registration data store. Cache 112 may similarly comprise a real physical system, a virtual machine such as those comprised within a virtualized data center or public or private cloud, or a computerized function or service component comprised within another node in the telecommunications network. Memory, as referred to in the context of shared registration data store 104 and/or the shared cache store 114 may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples. Further embodiments are envisaged. For example, whilst the above embodiments have been described in the context of an IMS network, the present disclosure may be similarly applied to other telecommunications networks, in particular those utilizing the Internet Protocol (IP). It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of processing data in a telecommunications network, the method comprising:
   receiving, by a node, from a network node in a cluster of network nodes, a subscriber configuration data request, wherein the subscriber configuration data request includes a request for subscriber configuration data for a subscriber device, wherein the subscriber device is one of a plurality of subscriber devices;
   in response to receiving the subscriber configuration data request, determining, by the node, that a shared cache store does not contain subscriber configuration data for the subscriber device, wherein the shared cache store includes a cache of subscription configuration data for the plurality of subscriber devices;
   in response to the determining, retrieving, by the node, subscriber configuration data for the subscriber device from a subscriber configuration network node, wherein the subscriber configuration network node is responsible for storing subscriber configuration data for the plurality of subscriber devices; and
   transmitting, by the node, the subscriber configuration data for the subscriber device retrieved from the subscriber configuration network node to the network node, wherein the cluster of network nodes are responsible for at least one of conducting registration procedures for subscriber devices and processing routing data relating to communication sessions conducted in the network, and wherein the shared cache store is accessible by each of the network nodes in the cluster of network nodes.

2. The method of claim 1, comprising storing the subscriber configuration data for the subscriber device retrieved from the subscriber configuration network node in the shared cache store.

3. The method of claim 1, comprising:
   receiving, from the subscriber configuration network node, a notification that subscriber configuration data for a given subscriber device has been updated at the subscriber configuration network node;
   in response to the notification, retrieving the updated subscriber configuration data for the given subscriber device from the subscriber configuration network node; and
   storing the updated subscriber configuration data for the given subscriber device retrieved from the subscriber configuration network node in the shared cache store.

4. The method of claim 3, wherein the notified updated subscriber configuration data comprises at least one of subscriber profile information and one or more initial filter criteria.

5. The method of claim 1, wherein the shared cache store comprises a clustered cache store wherein at least a first portion of the subscriber configuration data in the clustered cache store is stored in memory of a first node in the telecommunications network and at least a second, different portion of the subscriber configuration data in the clustered cache store is stored in memory of a second, different node in the telecommunications network.

6. The method of claim 5, wherein the first node in the telecommunications network comprises a given node in the cluster of network nodes and the second node in the telecommunications network comprises a different given node in the cluster of network nodes.

7. The method of claim 5, wherein subscriber configuration data for the subscriber device in the clustered cache store is stored in memory of the network node, in memory of the further network node or in memory of a different network node to the network node and further network node in the cluster of network nodes.

8. The method of claim 5, wherein the clustered registration data store comprises a Cassandra™ clustered data store.

9. The method of claim 1, wherein the subscriber configuration data comprises authentication data for use in conducting an authentication procedure in relation to the subscriber device.

10. The method of claim 9, further comprising determining whether the shared cache store contains authentication data for the subscriber device,
    wherein in the case of determining that the shared cache store does not contain authentication data for the subscriber device, the method comprises retrieving authentication data for the subscriber device from the subscriber configuration network node, the transmitted subscriber configuration data comprising at least the authentication data for the subscriber device retrieved from the subscriber configuration network node,
    wherein in the case of determining that the shared cache store does contain authentication data for the subscriber device, the method comprises retrieving authentication data for the subscriber device from the shared cache store, the transmitted subscriber configuration data comprising at least the authentication data for the subscriber device retrieved from the shared cache store.

11. The method of claim 10, wherein in the case of determining that the shared cache store does contain authentication data for the subscriber device or further determining that the shared cache store does contain one or more initial filter criteria data for the subscriber device, the method comprises identifying whether an expiry time associated with the subscriber configuration data for the subscriber device retrieved from the shared cache store has expired, wherein in the case of the identification identifying that the expiry time associated with the subscriber configuration data for the subscriber device retrieved from the shared cache store has expired, the method comprises retrieving non-expired subscriber configuration data for the subscriber device from the subscriber configuration network node and transmitting the non-expired subscriber configuration data for the subscriber device retrieved from the subscriber configuration network node to the yet further network node instead of transmitting the expired subscriber configuration data for the subscriber device retrieved from the shared cache store to the yet further network node.

12. The method of claim 11, comprising storing the non-expired subscriber configuration data in place of the expired subscriber configuration data in the shared cache store and resetting the associated expiry time for the stored non-expired subscriber configuration data.

13. The method of claim 9, wherein the authentication procedure comprises one or more of a Session Initiation Protocol (SIP) digest authentication procedure and an Internet Protocol Multimedia Subsystem (IMS) Authentication and Key Agreement (AKA) authentication.

14. The method of claim 1, wherein the received subscriber configuration data request is associated with registration of the subscriber device with the network.

15. The method of claim 1, further comprising:
    receiving, from a further network node in the cluster of network nodes, a further subscriber configuration data request associated with re-registration of the subscriber device with the network;
    in response to receipt of the further subscriber configuration data request, determining that the shared cache store does contain subscriber configuration data for the subscriber device;
    in response to the determination, retrieving subscriber configuration data for the subscriber device from the shared cache store; and
    transmitting the subscriber configuration data for the subscriber device retrieved from the shared cache store to the further network node.

16. The method of claim 15, wherein the further network node comprises a different node to the network node in the cluster of network nodes.

17. The method of claim 1, further comprising receiving, from a further network node in the cluster of network nodes, a further subscriber configuration data request associated with re-registration of the subscriber device with the network, wherein no authentication procedure for the subscriber device is conducted in association with re-registration of the subscriber device with the network.

18. The method of claim 1, wherein the subscriber configuration data comprises one or more initial filter criteria for use in a communication session setup request relating to the subscriber device, and wherein the method further comprises:
    determining whether the shared cache store contains one or more initial filter criteria for the subscriber device;
    wherein in the case of further determining that the shared cache store does not contain one or more initial filter criteria for the subscriber device, the method comprises retrieving one or more initial filter criteria for the subscriber device from the subscriber configuration network node, the transmitted subscriber configuration data comprising at least the retrieved one or more initial filter criteria for the subscriber device,
    wherein in the case of further determining that the shared cache store does contain one or more initial filter criteria for the subscriber device, the method comprises retrieving one or more initial filter criteria for the subscriber device from the shared cache store, the transmitted the subscriber configuration data comprising at least the retrieved one or more initial filter criteria for the subscriber device.

19. The method of claim 18, wherein the yet further network node comprises a different node to the network node and/or the further network node in the cluster of network nodes.

20. The method of claim 18, wherein the communication session setup request comprises a request to setup an outgoing communication session from the subscriber device.

21. The method of claim 18, wherein the communication session setup request comprises a request to setup an incoming communication session to the subscriber device.

22. The method of claim 18, wherein the communication session setup request comprises one or more of a Session Initiation Protocol (SIP) INVITE message, a SIP MESSAGE message, a SIP SUBSCRIBE message and a SIP PUBLISH message.

23. The method of claim 1, wherein the network comprises an Internet Protocol Multimedia System (IMS) network and the subscriber configuration network node comprises a Home Subscriber Server (HSS).

24. The method of claim 23, wherein subscriber configuration data is retrieved from the HSS via an IMS Cx interface between the HSS and the cache.

25. The method of claim 1, wherein the subscriber configuration data stored in the subscriber configuration network node and/or the shared cache store comprises one or more of:
    authentication data,
    user profile information, and
    one or more initial filter criteria.

26. The method of claim 1, wherein one or more of the registration request and the further registration request comprise Session Initiation Protocol (SIP) REGISTER messages.

27. The method of claim 1, wherein one or more of the nodes in the cluster of network nodes comprise Session Initiation Protocol (SIP) router, service and/or registrar nodes.

28. A system for processing data in a telecommunications network, the system comprising:
    at least one memory including computer program code;
    at least one processor in data communication with the memory, the processor being configured to:
        receive, from a network node in a cluster of network nodes, a subscriber configuration data request, wherein the subscriber configuration data request including a request for subscriber configuration data for a subscriber device, wherein the subscriber device is one of a plurality of subscriber devices;
        determine, in response to receipt of the subscriber configuration data request, that a shared cache store does not contain subscriber configuration data for the subscriber device, wherein the shared cache store includes a cache of subscriber configuration data for the plurality of subscriber devices;
        retrieve, in response to the determination, subscriber configuration data for the subscriber device from a subscriber configuration network node, wherein the subscriber configuration node is responsible for storing subscriber configuration data for the plurality of subscriber devices; and transmit the subscriber configuration data for the subscriber device retrieved from the subscriber configuration network node to the network node;

wherein the cluster of network nodes are responsible for at least one of conducting registration procedures for subscriber devices and processing routing data relating to communication sessions conducted in the network; and wherein the shared cache store is accessible by each of the network nodes in the cluster of network nodes.

29. A non-transitory computer-readable storage medium comprising computer-executable instructions which, when executed, cause a computerized device to perform a method of processing data in a telecommunications network, the method comprising: receiving, from a network node in a cluster of network nodes, a subscriber configuration data request, wherein the subscriber configuration data request including a request for subscriber configuration data for a subscriber device, wherein the subscriber device is one of a plurality of subscriber devices;

in response to receiving the subscriber configuration data request, determining that a shared cache store does not contain subscriber configuration data for the subscriber device, wherein the shared cache store includes a cache of subscriber configuration data for the plurality of subscriber devices;

in response to the determination, retrieving subscriber configuration data for the subscriber device from the subscriber configuration network node, wherein the subscriber configuration node is responsible for storing subscriber configuration data for the plurality of subscriber devices; and transmitting the subscriber configuration data for the subscriber device retrieved from the subscriber configuration network node to the network node;

wherein the cluster of network nodes are responsible for at least one of conducting registration procedures for subscriber devices and processing routing data relating to communication sessions conducted in the network; and wherein the shared cache store is accessible by each of the network nodes in the cluster of network nodes.

30. A method of processing data in a telecommunications network, the method comprising:

receiving, by a node, from a network node in a cluster of network nodes, a registration request, wherein the registration request including a request for registration of a subscriber device with the network, wherein the subscriber device is one of a plurality of subscriber devices;

determining, by the node, whether a shared cache store contains subscriber configuration data for the subscriber device, wherein the shared cache store includes a cache of subscriber configuration data for the plurality of subscriber devices;

in the case of a positive determination, retrieving, by the node, subscriber configuration data for the subscriber device from the shared cache store and transmitting the subscriber configuration data retrieved from the shared cache store to the network node; and in the case of a negative determination, retrieving, by the node, subscriber configuration data for the subscriber device from a subscriber configuration network node, wherein the subscriber configuration node is responsible for storing subscriber configuration data for the plurality of subscriber devices, transmitting the subscriber configuration data retrieved from the subscriber configuration network node to the network node, and storing the subscriber configuration data retrieved from the subscriber configuration network node in the shared cache store;

wherein the cluster of network nodes are responsible for at least one of conducting registration procedures for subscriber devices and processing routing data relating to communication sessions conducted in the network; and wherein the shared cache store is accessible by each of the network nodes in the cluster of network nodes.

* * * * *